United States Patent
Harmer

(10) Patent No.: US 11,215,045 B2
(45) Date of Patent: Jan. 4, 2022

(54) CHARACTERIZING RESPONSES IN A DRILLING SYSTEM

(71) Applicant: SCHLUMBERGER TECHNOLOGY CORPORATION, Sugar Land, TX (US)

(72) Inventor: Richard John Harmer, Cambridge (GB)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 16/811,922

(22) Filed: Mar. 6, 2020

(65) Prior Publication Data
US 2020/0277849 A1    Sep. 3, 2020

Related U.S. Application Data

(63) Continuation of application No. 14/983,121, filed on Dec. 29, 2015.
(Continued)

(51) Int. Cl.
*E21B 44/04* (2006.01)
*G05B 13/02* (2006.01)
(Continued)

(52) U.S. Cl.
CPC .............. *E21B 44/04* (2013.01); *E21B 44/06* (2013.01); *E21B 47/06* (2013.01); *E21B 47/07* (2020.05);
(Continued)

(58) Field of Classification Search
CPC ...... E21B 44/00; E21B 41/0092; E21B 45/00; E21B 47/00; E21B 44/02; E21B 47/06;
(Continued)

(56) References Cited

U.S. PATENT DOCUMENTS 5,467,832 A   11/1995   Orban et al.
5,590,958 A    1/1997   Dearing, Sr. et al.
(Continued)

FOREIGN PATENT DOCUMENTS

GB   2275778 A  *  9/1994  ............. E21B 44/02
WO   9715749 A2     5/1997
(Continued)

OTHER PUBLICATIONS

Aguiar et al., "On the Benefits of Automation in Improving the Drilling Efficiency in Offshore Activities", IADC/SPE 168025, 2014 IADC/SPE Drilling Conference and Exhibition, Mar. 2014, 12 pages.
(Continued)

*Primary Examiner* — James J Lee
*Assistant Examiner* — Shon G Foley
(74) *Attorney, Agent, or Firm* — Alec J. McGinn

(57) ABSTRACT

Computing systems, computer-readable media, and methods may include determining at least one automated sequence to be performed during a portion of a drilling operation by a drilling system. The at least one automated sequence may include performing one or more actions to cause a response in the drilling system. The method may include performing, during the drilling operation, the at least one automated sequence. Further, the method may include measuring, during the performance of the at least one automated sequence, one or more responses in the drilling system. The one or more responses may be measured within a wellbore undergoing the drilling operations and at a surface of the wellbore. The method may include modifying a model of the drilling system based at least in part of the one or more responses that were measured during the performance of the at least one automated sequence.

20 Claims, 11 Drawing Sheets

Related U.S. Application Data

(60) Provisional application No. 62/250,970, filed on Nov. 4, 2015.

(51) Int. Cl.

| | |
|---|---|
| *G01V 11/00* | (2006.01) |
| *E21B 47/06* | (2012.01) |
| *E21B 44/06* | (2006.01) |
| *G05B 11/01* | (2006.01) |
| *E21B 47/07* | (2012.01) |

(52) U.S. Cl.
CPC ........... *G01V 11/002* (2013.01); *G05B 11/01* (2013.01); *G05B 13/021* (2013.01)

(58) Field of Classification Search
CPC ......... E21B 44/04; E21B 44/06; G05B 15/02; G05B 2219/45129; G05B 13/041
See application file for complete search history.

(56) References Cited

U.S. PATENT DOCUMENTS

| | | | |
|---|---|---|---|
| 5,775,803 | A | 7/1998 | Montgomery et al. |
| 5,959,547 | A | 9/1999 | Tubel et al. |
| 6,029,951 | A | 2/2000 | Guggari |
| 6,050,348 | A | 4/2000 | Richarson et al. |
| 6,272,434 | B1 | 8/2001 | Wisler et al. |
| 6,338,390 | B1 | 1/2002 | Tibbitts |
| 6,374,925 | B1 | 4/2002 | Elkins et al. |
| 6,382,331 | B1 | 5/2002 | Pinckard |
| 6,484,816 | B1 | 11/2002 | Koederitz |
| 6,527,062 | B2 | 3/2003 | Elkins et al. |
| 6,626,238 | B2 | 9/2003 | Hooper |
| 6,662,110 | B1 | 12/2003 | Bargach et al. |
| 6,732,052 | B2 | 5/2004 | Macdonald et al. |
| 6,749,330 | B2 | 6/2004 | Allen |
| 6,803,760 | B2 | 10/2004 | Jones et al. |
| 6,892,812 | B2 | 5/2005 | Niedermayr et al. |
| 6,896,055 | B2 | 5/2005 | Koithan |
| 6,925,392 | B2 | 8/2005 | McNeil, III et al. |
| 6,925,807 | B2 | 8/2005 | Jones et al. |
| 6,931,621 | B2 | 8/2005 | Green et al. |
| 6,994,172 | B2 | 2/2006 | Ray |
| 7,038,965 | B2 | 5/2006 | Shih |
| 7,044,237 | B2 | 5/2006 | Leuchtenberg |
| 7,044,239 | B2 | 5/2006 | Pinckard et al. |
| 7,054,750 | B2 | 5/2006 | Rodney et al. |
| 7,059,427 | B2 | 6/2006 | Power et al. |
| 7,100,708 | B2 | 9/2006 | Koederitz |
| 7,114,577 | B2 | 10/2006 | Newman |
| 7,138,925 | B2 | 11/2006 | Nield |
| 7,152,696 | B2 | 12/2006 | Jones |
| 7,172,037 | B2 | 2/2007 | Dashevskiy et al. |
| 7,243,735 | B2 | 7/2007 | Koederitz et al. |
| 7,264,050 | B2 | 9/2007 | Koithan et al. |
| 7,278,496 | B2 | 10/2007 | Leuchtenberg |
| 7,306,054 | B2 | 12/2007 | Hutchinson |
| 7,357,196 | B2 | 4/2008 | Goldman et al. |
| 7,367,411 | B2 | 5/2008 | Leuchtenberg |
| 7,404,454 | B2 | 7/2008 | Hulick |
| 7,461,705 | B2 | 12/2008 | Hulick et al. |
| 7,588,100 | B2 | 9/2009 | Hamilton |
| 7,591,304 | B2 | 9/2009 | Juhasz et al. |
| 7,672,262 | B2 | 3/2010 | McCoy et al. |
| 7,730,967 | B2 | 6/2010 | Ballantyne et al. |
| 7,823,655 | B2 | 11/2010 | Boone et al. |
| 7,823,656 | B1 | 11/2010 | Williams |
| 7,860,593 | B2 | 12/2010 | Boone |
| 7,874,351 | B2 | 1/2011 | Hampton et al. |
| 7,895,220 | B2 | 2/2011 | Evans et al. |
| 7,896,084 | B2 | 3/2011 | Haugen |
| 7,921,937 | B2 | 4/2011 | Brackin et al. |
| 7,938,197 | B2 | 5/2011 | Boone et al. |
| 7,945,488 | B2 | 5/2011 | Karr et al. |
| 7,980,326 | B2 | 7/2011 | Tibbitts et al. |
| 8,042,623 | B2 | 10/2011 | Quernheim et al. |
| 8,103,493 | B2 | 1/2012 | Sagert et al. |
| 8,121,971 | B2 | 2/2012 | Edwards et al. |
| 8,131,510 | B2 | 3/2012 | Wingky et al. |
| 8,145,464 | B2 | 3/2012 | Arnegaard et al. |
| 8,154,419 | B2 | 4/2012 | Daussin et al. |
| 8,201,628 | B2 | 6/2012 | Lovorn et al. |
| 8,210,283 | B1 | 7/2012 | Benson et al. |
| 8,215,417 | B2 | 7/2012 | Annaiyappa et al. |
| 8,261,826 | B2 | 9/2012 | Lovorn et al. |
| 8,281,875 | B2 | 10/2012 | Lovorn et al. |
| 8,286,730 | B2 | 10/2012 | Pool et al. |
| 8,301,386 | B1 | 10/2012 | Redmond et al. |
| 8,347,957 | B2 | 1/2013 | Stephenson et al. |
| 8,360,171 | B2 | 1/2013 | Boone et al. |
| 8,381,838 | B2 | 2/2013 | Hutniak et al. |
| 8,386,059 | B2 | 2/2013 | Boone |
| 8,387,720 | B1 | 3/2013 | Keast et al. |
| 8,397,836 | B2 | 3/2013 | Pool et al. |
| 8,404,297 | B2 | 3/2013 | Arango Moreno |
| 8,417,456 | B2 | 4/2013 | Mauldin et al. |
| 8,561,720 | B2 | 10/2013 | Edbury et al. |
| 8,590,635 | B2 | 11/2013 | Koederitz |
| 8,602,126 | B2 | 12/2013 | Boone et al. |
| 8,616,274 | B2 | 12/2013 | Belcher et al. |
| 8,718,802 | B2 | 5/2014 | Boone |
| 8,794,353 | B2 | 8/2014 | Benson et al. |
| 8,812,236 | B1 | 8/2014 | Freeman et al. |
| 8,818,779 | B2 | 8/2014 | Sadlier et al. |
| 8,833,488 | B2 | 9/2014 | Knudsen et al. |
| 8,899,348 | B2 | 12/2014 | Henderson et al. |
| 8,905,157 | B2 | 12/2014 | Jiao et al. |
| 8,939,233 | B2 | 1/2015 | Edbury et al. |
| 8,939,234 | B2 | 1/2015 | Mebane, III et al. |
| 9,027,671 | B2 | 5/2015 | Koederitz |
| 9,062,524 | B2 | 6/2015 | Calvo et al. |
| 9,080,407 | B2 | 7/2015 | Bernard |
| 9,157,309 | B1 | 10/2015 | Benson et al. |
| 9,169,700 | B2 | 10/2015 | Curtis et al. |
| 9,175,557 | B2 | 11/2015 | Iversen et al. |
| 9,223,594 | B2 | 12/2015 | Brown et al. |
| 9,249,638 | B2 | 2/2016 | Bernard |
| 9,249,654 | B2 | 2/2016 | Strachan et al. |
| 9,285,794 | B2 | 3/2016 | Wang et al. |
| 9,290,995 | B2 | 3/2016 | Boone et al. |
| 9,322,247 | B2 | 4/2016 | Rojas et al. |
| 9,359,881 | B2 | 6/2016 | DiSantis |
| 9,388,681 | B2 | 7/2016 | Dykstra et al. |
| 9,410,417 | B2 | 8/2016 | Reckmann et al. |
| 9,410,418 | B2 | 8/2016 | Papouras et al. |
| 9,436,173 | B2 | 9/2016 | Wang et al. |
| 9,441,428 | B1 | 9/2016 | Barnes et al. |
| 9,464,517 | B2 | 10/2016 | Papouras et al. |
| 9,482,083 | B2 | 11/2016 | Doris |
| 9,506,336 | B2 | 11/2016 | Orbell |
| 9,528,334 | B2 | 12/2016 | Davis et al. |
| 9,593,566 | B2 | 3/2017 | Hoehn et al. |
| 9,593,567 | B2 | 3/2017 | Pink et al. |
| 9,598,947 | B2 | 3/2017 | Wang et al. |
| 9,650,880 | B2 | 5/2017 | Bowley et al. |
| 9,689,250 | B2 | 6/2017 | Badkoubeh et al. |
| 2003/0168257 | A1 | 9/2003 | Aldred et al. |
| 2003/0212898 | A1 | 11/2003 | Steele et al. |
| 2007/0289778 | A1 | 12/2007 | Watkins et al. |
| 2011/0186353 | A1* | 8/2011 | Turner .................. G01H 1/003 175/40 |
| 2013/0032407 | A1 | 2/2013 | Edbury et al. |
| 2013/0186688 | A1* | 7/2013 | Rasmus .................. E21B 21/08 175/48 |
| 2014/0151121 | A1 | 6/2014 | Boone et al. |
| 2014/0246238 | A1 | 9/2014 | Abbassian et al. |
| 2014/0299377 | A1 | 10/2014 | Abbassian et al. |
| 2014/0299378 | A1 | 10/2014 | Abbassian et al. |
| 2014/0305702 | A1 | 10/2014 | Bowley et al. |
| 2014/0309936 | A1 | 10/2014 | Abbassian et al. |
| 2015/0039230 | A1 | 2/2015 | Proett et al. |
| 2015/0101865 | A1 | 4/2015 | Mauldin et al. |
| 2015/0105912 | A1 | 4/2015 | Dykstra |

(56) References Cited

U.S. PATENT DOCUMENTS

| | | |
|---|---|---|
| 2015/0241871 A1 | 8/2015 | Yoshino et al. |
| 2015/0252664 A1* | 9/2015 | Astrid ............... E21B 44/04 700/275 |
| 2015/0345262 A1 | 12/2015 | Kpetehoto et al. |
| 2015/0369030 A1 | 12/2015 | Hay et al. |
| 2016/0024906 A1 | 1/2016 | Jamison et al. |
| 2016/0047220 A1 | 2/2016 | Sharp et al. |
| 2016/0076354 A1 | 3/2016 | Lai et al. |
| 2016/0160627 A1 | 6/2016 | Aitken |
| 2016/0168973 A1 | 6/2016 | Dykstra et al. |
| 2016/0194950 A1 | 7/2016 | Zheng et al. |
| 2016/0222775 A1 | 8/2016 | Tunc et al. |
| 2016/0230530 A1 | 8/2016 | Dykstra et al. |
| 2016/0237802 A1 | 8/2016 | Boone et al. |
| 2016/0275133 A1 | 9/2016 | Moore |
| 2016/0290046 A1 | 10/2016 | Orban et al. |
| 2016/0290073 A1 | 10/2016 | Zheng et al. |
| 2016/0290119 A1 | 10/2016 | Tunc et al. |
| 2016/0290120 A1 | 10/2016 | Zheng et al. |
| 2016/0291201 A1 | 10/2016 | Tunc et al. |
| 2016/0321330 A1 | 11/2016 | Ziegler et al. |
| 2016/0333673 A1 | 11/2016 | Anno et al. |
| 2016/0369619 A1 | 12/2016 | Parmeshwar et al. |
| 2017/0226813 A1 | 8/2017 | Northam et al. |
| 2017/0268324 A1* | 9/2017 | Moore ............... E21B 44/02 |

FOREIGN PATENT DOCUMENTS

| | | |
|---|---|---|
| WO | 2004090285 A1 | 10/2004 |
| WO | 2007005822 A2 | 1/2007 |
| WO | 2013000094 A1 | 1/2013 |
| WO | 2016102381 A1 | 6/2016 |
| WO | 2016167747 A1 | 10/2016 |

OTHER PUBLICATIONS

Brett et al., "Field Experiences With Computer-Controlled Drilling", SPE 20107, 1990 Permian Basin Oil and Gas Recovery Conference, Mar. 1990, pp. 197-212.

Effendi, "Adding a Drill Pipe Procedure While Drilling Ahead", Jul. 14, 2013; retreived Dec. 7, 2016, http://petroleumsupport.com/procedure-for-adding-drill-pipe-when-drilling-ahead.

Genevois et al., "Gyrostab Project: The Missing Link—Azimuth and inclination mastered with new principles for standard roatry BHAs", SPE/IADC 79915, SPE/IADC Drilling Conference, Feb. 2003, 11 pages.

Halsey et al., "Tor+2:8que Feedback Used to Cure Slip-Stick Motion", SPE 18049, 63rd Annual Technical Conference and Exhibition of the Petroleum Engineers, Oct. 1988, pp. 277-282.

Jones et al., "Stick-Slip and Torsional Oscillation Control in Challenging Formation—A New Solution to an Old Problem", AADE-17-NTCE-076, 2017 AADE National Technical Conference and Exhibition, Apr. 2017, 10 pages.

Stockhausen et al., "Continuous Direction and Inclination Measurements Lead to an Improvement in Wellbore Positioning", SPE/IADC 79917, SPE/IADC Drilling Conference, Feb. 2003, 16 pages.

* cited by examiner

CHARACTERIZING RESPONSES IN A DRILLING SYSTEM

CROSS-REFERENCE TO RELATED APPLICATION

This application claims priority to U.S. patent application Ser. No. 14/983,121 filed Dec. 29, 2015 with the same title and U.S. Patent Application 62/250,970 filed Nov. 4, 2015. Both applications are incorporated by reference in their entirety herein.

BACKGROUND

In hydrocarbon exploration industries, models of physical response of a drilling system may be used in the planning phase of a drilling operation. Drilling operation involves three separate mechanical operations at the surface, namely pumping mud, rotating the pipe, and moving the travelling block. Each of the surface mechanical operations has an associated force term: a pressure to pump fluid, a torque to turn the drill string, and a load on the hook from suspending the drill string in the well. Manual operations may be undertaken during the drilling phase to characterize the response of the drilling system. Additional, the manual operations may be undertaken to facilitate model calibration, which is then used for drilling parameter selection and abnormal trend identification. Examples of manual operations may include: manually performing a drill off test where rate of penetration ("ROP") and downhole torque-on-bit are recorded at different weight on bit ("WOB") and revolution per minute ("RPM") combinations; manually circulating off bottom at different rates to calibrate a hydraulics model; manually taking pick-up, slack off and rotating weights as per a pre-defined sequence to calibrate a torque and drag model.

With the advent of automated drilling, at least some of the drilling process may be computer-controlled, e.g., "autodriller" operations. However, no methods or systems are available that automatically integrate operations to characterize the response of the drilling system during the drilling operations.

SUMMARY

Embodiments of the present disclosure may provide a method. The method may include determining at least one automated sequence to be performed during a portion of a drilling operation by a drilling system. The at least one automated sequence may include performing one or more actions to cause a response in the drilling system. The method may also include performing, during the drilling operation, the at least one automated sequence. Further, the method may include measuring, during the performance of the at least one automated sequence, one or more responses in the drilling system. The one or more responses may be measured within a wellbore undergoing the drilling operations and at a surface of the wellbore. The method may include modifying a model of the drilling system based at least in part of the one or more responses that were measured during the performance of the at least one automated sequence.

In an embodiment, the method may further include altering one or more operational parameters in the drilling operations based at least in part on the one or more responses in the drilling system.

In an embodiment, the one or more operational parameters may include flow rate of drilling mud, rotational speed of a drill string, motion of a bottom hole assembly, and safety limits of the drilling system.

In an embodiment, the one or more responses may be measured by sensors positioned at one or more locations comprising a surface location of the drilling system, a location within the wellbore, a location on a drill string, and a location in a bottom hole assembly.

In an embodiment, the at least one automated sequence include one or more of: a sequence of taking off-bottom pick up, slack off, and torque references at different rates; a sequence for shutting down flow rate and revolutions per minute (RPM) at an end of a connection, and bringing up flow rate and RPM at a start of a connection; a sequence of moving a block up and down to characterize sheave friction and remove an effect from weight on bit (WOB) and hookload calculations; a sequence of characterizing a relationships between the one or more operational parameters and bottom hole assembly (BHA) vibrations during the drilling operations; a sequence where a slider system cycles torque to improve weight transfer and control toolface with downhole feedback in a form of a BHA toolface; a sequence of monitoring a change in surface hookload at a range of flow rates circulating with rotation off bottom; a sequence of staging up the WOB at a constant RPM to identify a point at which the rotational system becomes unstable and enters into fully developed stick-slip; a sequence that sweeps through a range of surface RPM's off bottom to identify the locations of lateral BHA resonances; a sequence that pumps drilling mud at different flow rates; a sequence that dynamically tunes an autodriller gain settings based upon a real-time derived bit-rock interaction model; a sequence that automatically modulates pump stroke rates; a sequence that varies weight when drilling with a motor and rotating and measuring pressure; a sequence that varies the flow rate and measures motor speed; a sequence that varies the flow rate and the WOB and measuring motor speed and pressure; a sequence that varies at least one of rotation speed or flow and measuring temperature at along a drill string; and a sequence that moves the block down at varying rates.

In an embodiment, the method may further include storing the one or more responses in the drilling system.

In an embodiment, the method may further include determining, prior to performing the at least one automated sequence, that the at least one automated sequence requires an update based at least partially on a change in conditions in the drilling operation. The method may also include updating the at least one automated sequence in response to the change in the condition in the drilling operation.

Embodiments of the present disclosure may provide a non-transitory computer readable storage medium storing instructions for causing one or more processors to perform a method. The method may include determining at least one automated sequence to be performed during a portion of a drilling operation by a drilling system. The at least one automated sequence may include performing one or more actions to cause a response in the drilling system. The method may also include performing, during the drilling operation, the at least one automated sequence. Further, the method may include measuring, during the performance of the at least one automated sequence, one or more responses in the drilling system. The one or more responses may be measured within a wellbore undergoing the drilling operations and at a surface of the wellbore. The method may include modifying a model of the drilling system based at least in part of the one or more responses that were measured during the performance of the at least one automated sequence.

Embodiments of the present disclosure may provide a system. The system may include one or more memory devices storing instructions. The system may also include one or more processors coupled to the one or more memory devices and may execute the instructions to perform a method. The method may include determining at least one automated sequence to be performed during a portion of a drilling operation by a drilling system. The at least one automated sequence may include performing one or more actions to cause a response in the drilling system. The method may also include performing, during the drilling operation, the at least one automated sequence. Further, the method may include measuring, during the performance of the at least one automated sequence, one or more responses in the drilling system. The one or more responses may be measured within a wellbore undergoing the drilling operations and at a surface of the wellbore. The method may include modifying a model of the drilling system based at least in part of the one or more responses that were measured during the performance of the at least one automated sequence.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1A:
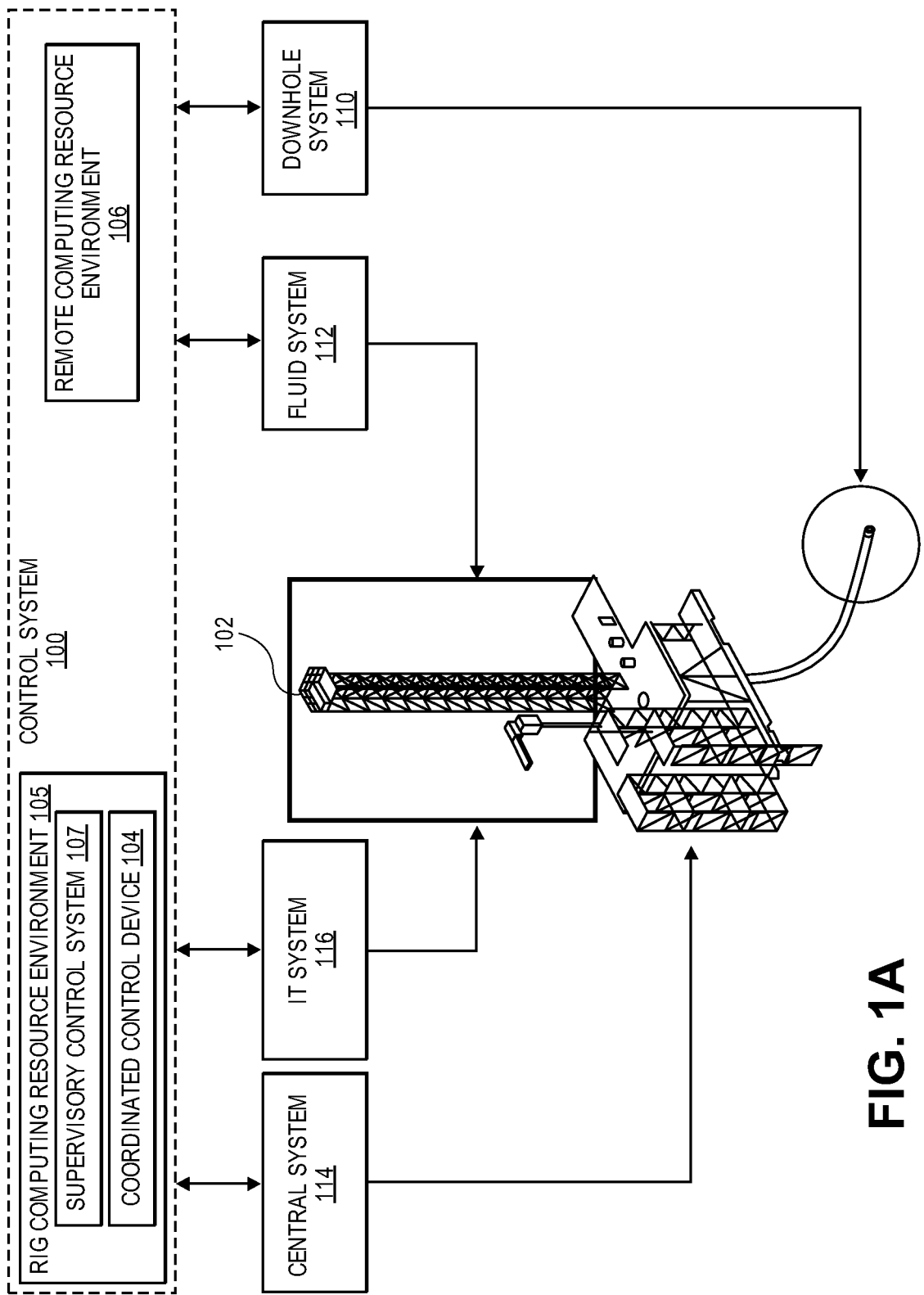
FIGS. 1A and 1B illustrate a schematic view of a drilling rig and a control system, according to an embodiment.

FIG. 1A illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection). In some embodiments, the remote computing resource environment 106 may be at least partially located onsite, e.g., allowing control of various aspects of the drilling rig 102 onsite through the remote computing resource environment 105 (e.g., via mobile devices). Accordingly, "remote" should not be limited to any particular distance away from the drilling rig 102.

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1A. For example, the drilling rig 102 may include a downhole system 110, a fluid system 112, and a central system 114. These systems 110, 112, 114 may also be examples of "subsystems" of the drilling rig 102, as described herein. In some embodiments, the drilling rig 102 may include an information technology (IT) system 116. The downhole system 110 may include, for example, a bottom-hole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drive, rotary table, kelly, drawworks, pumps, generators, tubular handling equipment, derrick, mast, substructure, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, safety concerns for different control systems, etc.). An embodiment of the control system 100 that is unified, may, however, provide control over the drilling rig 102 and its related systems (e.g., the downhole system 110, fluid system 112, and/or central system 114, etc.). Further, the downhole system 110 may include one or a plurality of downhole systems. Likewise, fluid system 112, and central system 114 may contain one or a plurality of fluid systems and central systems, respectively.

In addition, the coordinated control device 104 may interact with the user device(s) (e.g., human-machine interface(s)) 118, 120. For example, the coordinated control device 104 may receive commands from the user devices 118, 120 and may execute the commands using two or more of the rig systems 110, 112, 114, e.g., such that the operation of the two or more rig systems 110, 112, 114 act in concert and/or off-design conditions in the rig systems 110, 112, 114 may be avoided.

Figure 1B:
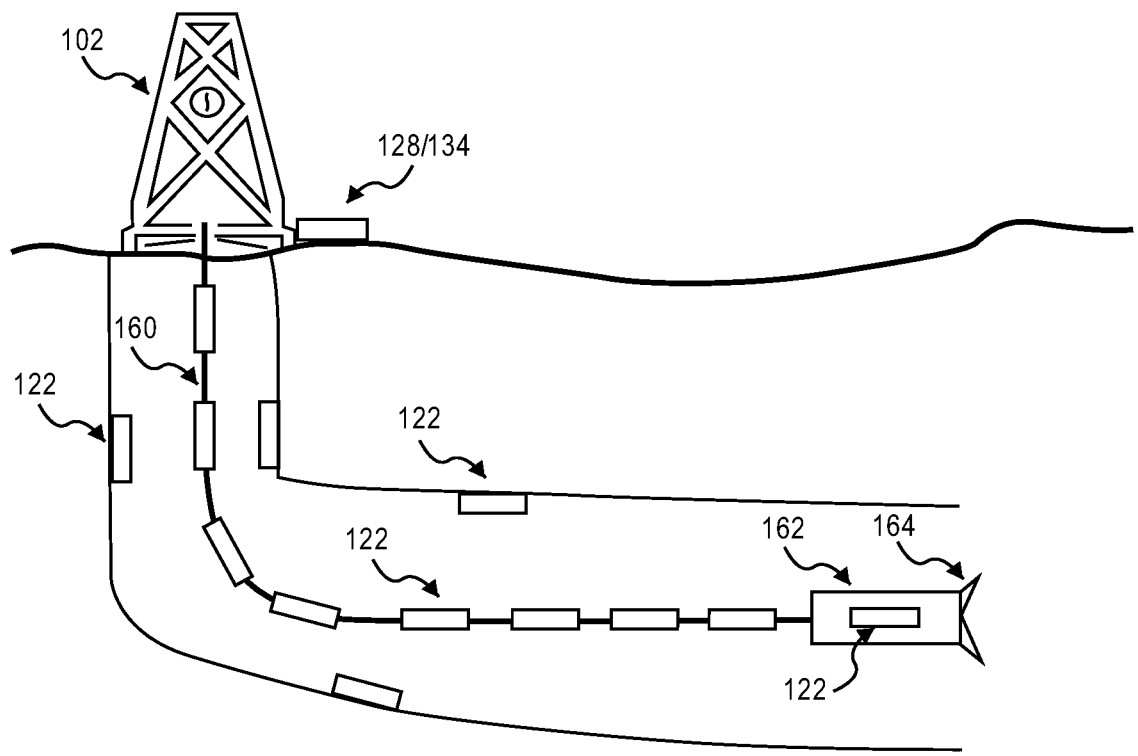

FIG. 1B illustrates a more detailed example of the drilling rig 102 and associated equipment that may be used during drilling operations. As illustrated in FIG. 1B, the drilling rig 102 may be coupled to a drill string 160. The drilling rig 102 may include equipment to advance and rotate the drill string 160 and pump drilling fluid or "mud" into the drill string 160, for example from the fluid system 112. The drill string 160 may include a bottom hole assembly (BHA) 162 coupled to the terminal end of the drill string 160. The BHA 162 may include a drill bit 164. The drill bit 164 may remove rock from the wellbore to create the well. The drill bit 164 may be powered by drilling fluid or "mud" pumped down the drill string 160 by the drilling rig 102. To measure conditions within the wellbore, one or more sensors 122 may be located within the wellbore. For example, the drill string 160 may include one or more of sensors 122 and the BHA 162 may include one or more sensors 122. Likewise, for example, one or more sensors 122 may be located within the wellbore itself, e.g., located on the wall of the wellbore, located on or within a casing of the wellbore, etc. Additionally, one or more sensors 128 and 134 may be located on the surface at the drilling rig 102. The sensors 122, sensors 128, and sensors 134 may be utilized by the control system 100 to measure and monitor operating parameters and responses of the drilling system during drilling operations. For example, the operating parameters and responses can include pressure in the drill string 160, pumping pressure of the drilling mud, rotational speed of the drill bit, location of the BHA 206, length of the drill string 160, pressure in the wellbore, temperature in the wellbore, flow rate of the drilling mud, and the like. The sensors 122, sensors 128, and sensors 134 may include temperature sensors, pressure sensors, geolocation sensors, acceleration sensors, rotational sensors, flow rate sensors, and the like.

Figure 2:
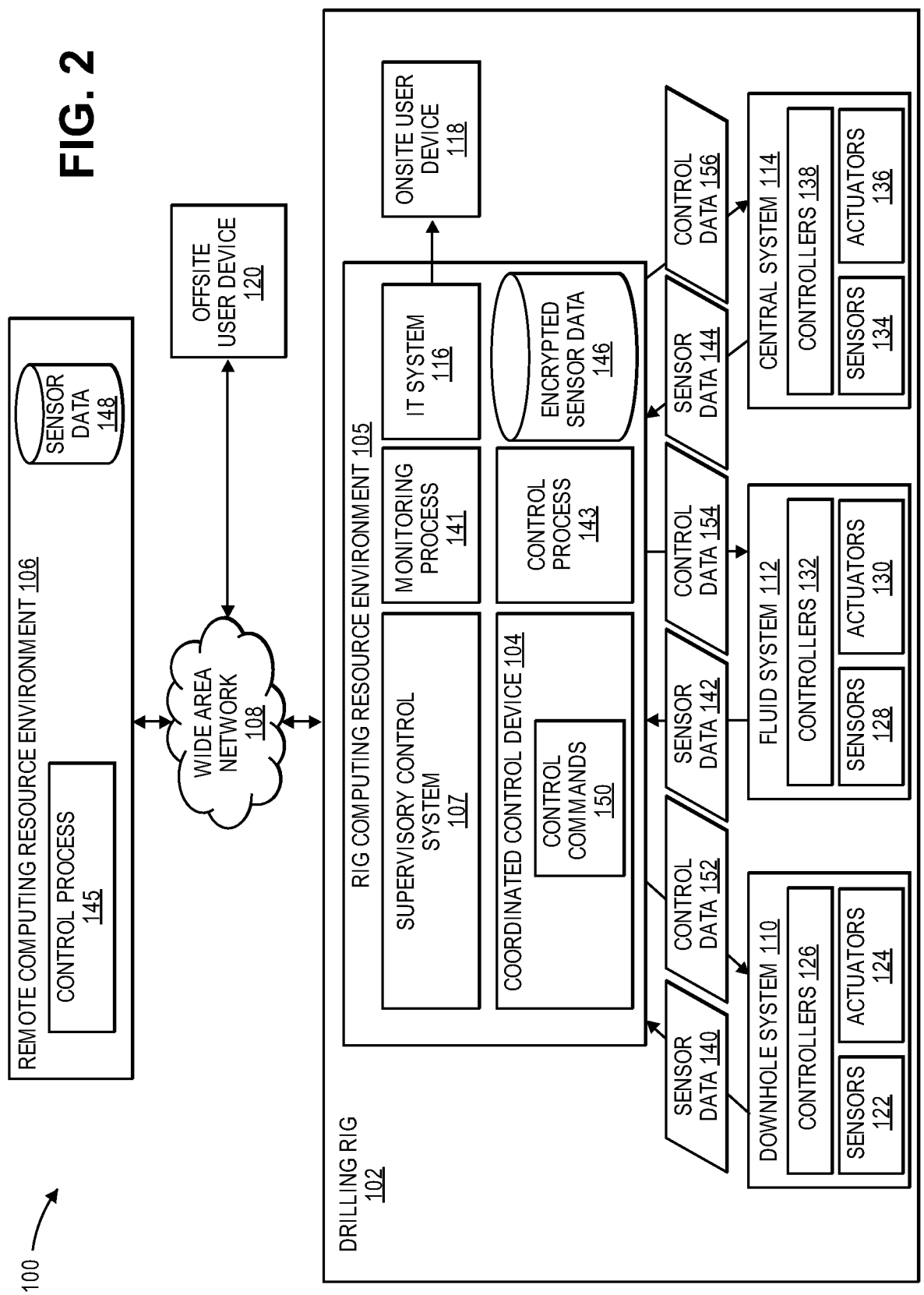
FIG. 2 illustrates a schematic view of a drilling rig and a remote computing resource environment, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The user devices 118 and/or 120 may be examples of a human-machine interface. These devices 118, 120 may allow feedback from the various rig subsystems to be displayed and allow commands to be entered by the user. In various embodiments, such human-machine interfaces may be onsite or offsite, or both.

The systems of the drilling rig 102 may include various sensors, actuators, and controllers (e.g., programmable logic controllers (PLCs)), which may provide feedback for use in the rig computing resource environment 105. For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data feedback to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

As mentioned, the control system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

As described above, the control system 100 may be used field development planning and drilling operations. In embodiments, the control system 100 may be used to simulate or model drilling one or more wells and controlling the drilling equipment during drilling operations. In embodiments, the control system 100 may be used to characterize responses in the drilling system during drilling operations. To characterize response during drilling operations, the control system 100 may utilize one or more automated sequences. In embodiments, the automated sequences may be a series of operations, over a period of time, that vary one or more operating parameters of the drilling operation while holding constant other operational parameters of the drilling operation.

In some embodiments, for example, the automated sequences preformed by the control system 100 may actively perturb the drilling system or drive the drilling system in a controlled manner through to a range of different places within its operational envelope and collect feedback at both the surface and downhole. Downhole may be at the BHA 162 and at multiple points along the drill string 160. In some embodiments, for example, in the hydraulics domain, the perturbations/sequences may be performed at points during the drilling process where the wellbore conditions are known. In some embodiments, for example, rather than perturbing the drilling system, the automated sequences performed by the control system 100 may also utilize situations present within a normal drilling operation where the system is driven through a range of conditions, such as the process of making a connection and going on bottom. In some embodiments, for example, the automated sequences performed by the control system 100 may probe where the operational boundaries lie in a systematic manner.

Due to the physics, some properties change as the wellbore is propagated and the lengths of the drill string and mud column change. In some embodiments, for example, the automated sequences may be scheduled and performed at multiple points during the drilling operations. This may allow information to be obtained not only by measuring the characteristics of the system at one point in time or depth, but also by monitoring how these characteristics change as the well construction process advances. In some embodiments, for example, the control system 100 may be aware of the changes taking place during drilling operations (e.g. the drill string 160 getting longer). In response to the changes, the control system 100 may automatically update the automated sequences in accordance with the evolving well construction. For example, as the drill string 160 increases in length, it may take more time for the rotational speed to stabilize downhole after startup. In this example, the automated sequence may be modified so a wait period would be extended prior to taking an off bottom reference.

During performance of the automated sequences, the system 100 can measure and record the responses of the drilling system to the automated sequences. To acquire a complete view of the response, measurement may be acquired at the surface and downhole within the wellbore, for example, by sensors 122, 128, and 134. The measured and recorded responses may be used to update models of the drilling system and modify the operational parameters of the drilling operations. The system 100 may automatically link measured and recorded responses back into the setup/calibration of real-time models. In some embodiments, the measured and recorded responses may be stored for use in future drilling operations. For example, the measured and recorded responses may be stored as a matrix of system response properties identified using automated sequences/modulation in depth and time domains.

By utilizing the automated sequences, the control system 100 may achieve a level of consistency and simultaneous control of multiple variables (pump, rotation, and block position) that is not possible by a human driller. Not only can automation allow better control of simultaneous parameters, the system 100 may be automatically adjusted to fit the context and can be repeatable. Likewise, by using the automated sequences during the drilling operations, the system 100 may use the data collected to control the drilling system behavior going forward in real-time—i.e., the system 100 may be continuously learning.

Figure 3:
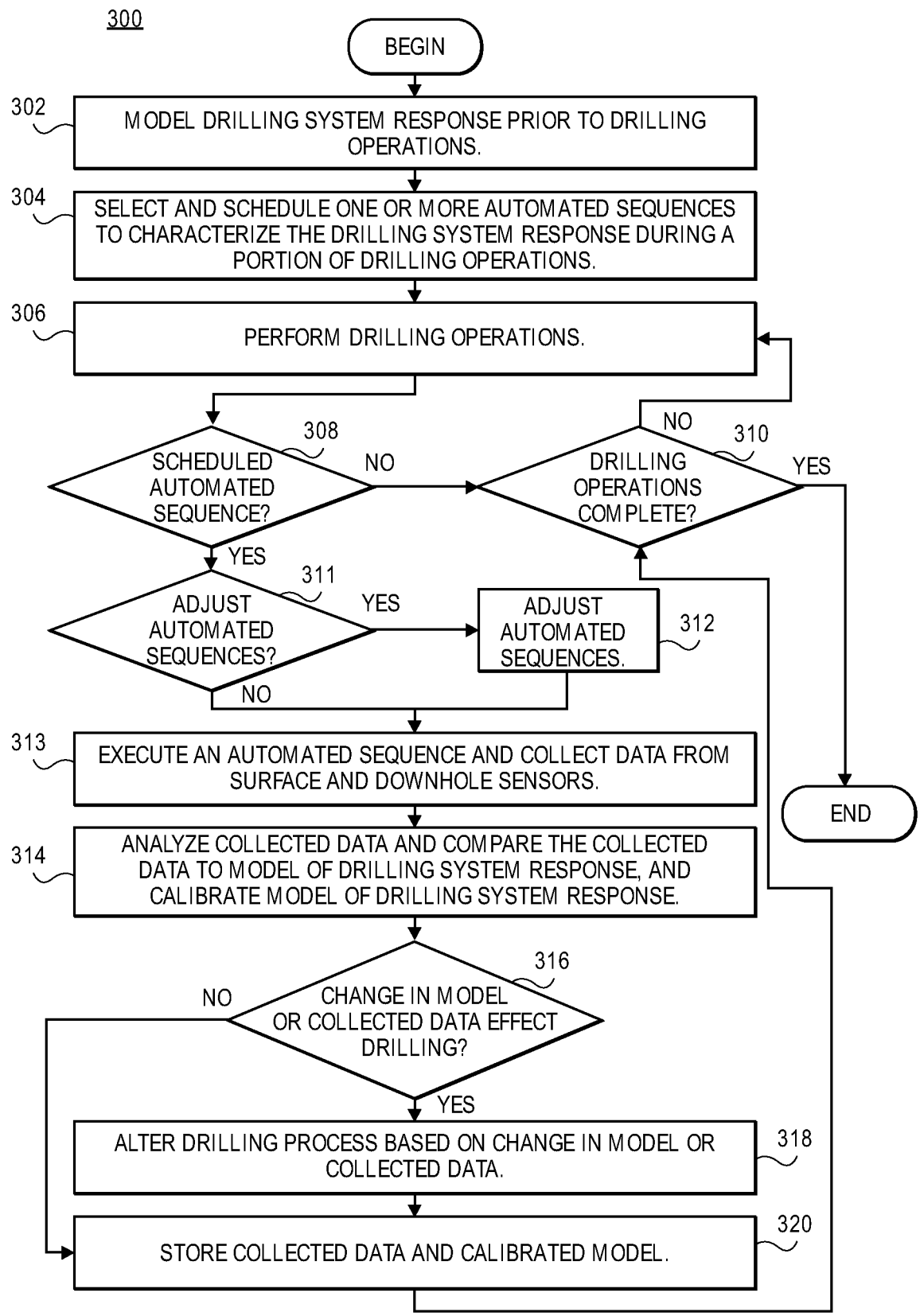
FIG. 3 illustrate a flowchart of a method for characterizing responses in drilling operations according to an embodiment.

FIG. 3 illustrates a flowchart of a method 300 for characterizing responses in a drilling system. The illustrated stages of the method are examples and any of the illustrated stages may be removed, additional stages may be added, and the order of the illustrated stages may be changed.

In 302, responses of the drilling system may be modeled prior to drilling operations. In some embodiments, for example, the model of the response in the drilling system can describe the expected operation when drilling in a formation. The model may also include operational parameters of the drilling operations to deliver the expected operation. The operational parameters may include any factors that may be controlled to operate the drilling system. For example, drilling operations may involve three separate mechanical operations at the surface: pumping drilling mud, rotating the pipe, and moving the travelling block. Each of the surface mechanical operations may an associated force term: a pressure to pump fluid, a torque to turn the drill string, and a load from a weight of the drill string, for example, load on the hook from suspending the drill string in the well.

In some embodiments, for example, the drilling system response may be modeled based on drilling operations in offset wells and industry experience. In some embodiments, the drilling system response may be modeled automatically by the system 100. In some embodiment, the drilling system response can be modeled by the system 100 with input from a user.

In 304, one or more automated sequences can be selected and scheduled to characterize the drilling system responses during a portion of the drilling operations. In some embodiments, for example, the automated sequences may be a series of operations, over a period of time, that vary one or more operating parameters of the drilling operation while holding constant other operational parameters of the drilling operation. In some embodiments, the automated sequences may be integrated into the drilling process or other aspects of the well construction process such as casing running and cementing. For example, while standard operations rates (flow rate, RPM and to a lesser extent weight on bit) are constant, the dependence of the force terms on the rates of operation provide information about the drilling system and the rock being drilled.

In some embodiments, for example, the drilling operations may include multiple automated sequences to be performed. For example, a bit run may include multiple automated sequences to be performed during the bit run. Likewise, for example, each bit run during the drilling operations may include separate automated sequences to be performed. In some embodiments, the automated sequences may be selected and scheduled automatically by the system 100. In some embodiment, the automated sequences may be selected and scheduled by the system 100 with input from a user.

Figure 4A:
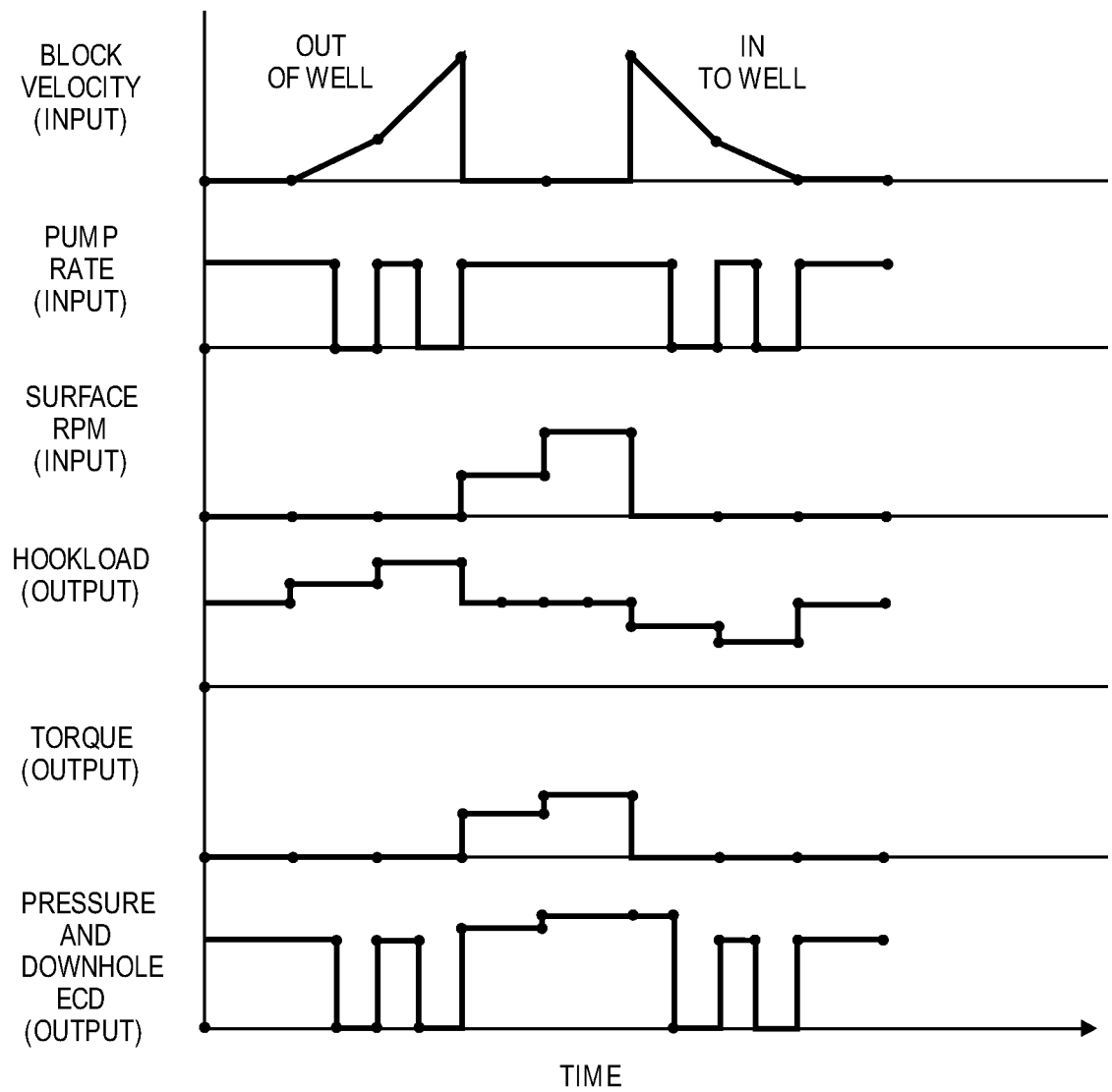
FIGS. 4A, 4B, 4C, 4D, 4E, 4F, and 4G illustrate examples of automated sequences according to an embodiment.

In some embodiments, for example, an automated sequence may include a programmed process of taking off-bottom pick up, slack off and torque references at different rates. For example, the process may include two different constant block velocities picking up and slacking off. Additionally, for example, two different rotational speeds for off bottom torque reference. FIG. 4A illustrates one example of a programmed process of bottom taking off bottom pick up, slack off and torque references at different rates. As illustrated in FIG. 4A, the sequence may include varying, over time, the block velocity, the pump rate, and the surface RPM. The control system 100 may measure the responses to the sequence performed by the drilling system, for example, using one or more of the sensors 122, 128, and 134 located both at the surface and downhole. For example, hookload and torque may be measured at the surface, and pressure and equivalent circulating density (ECD) may be measured downhole.

Figure 4B:
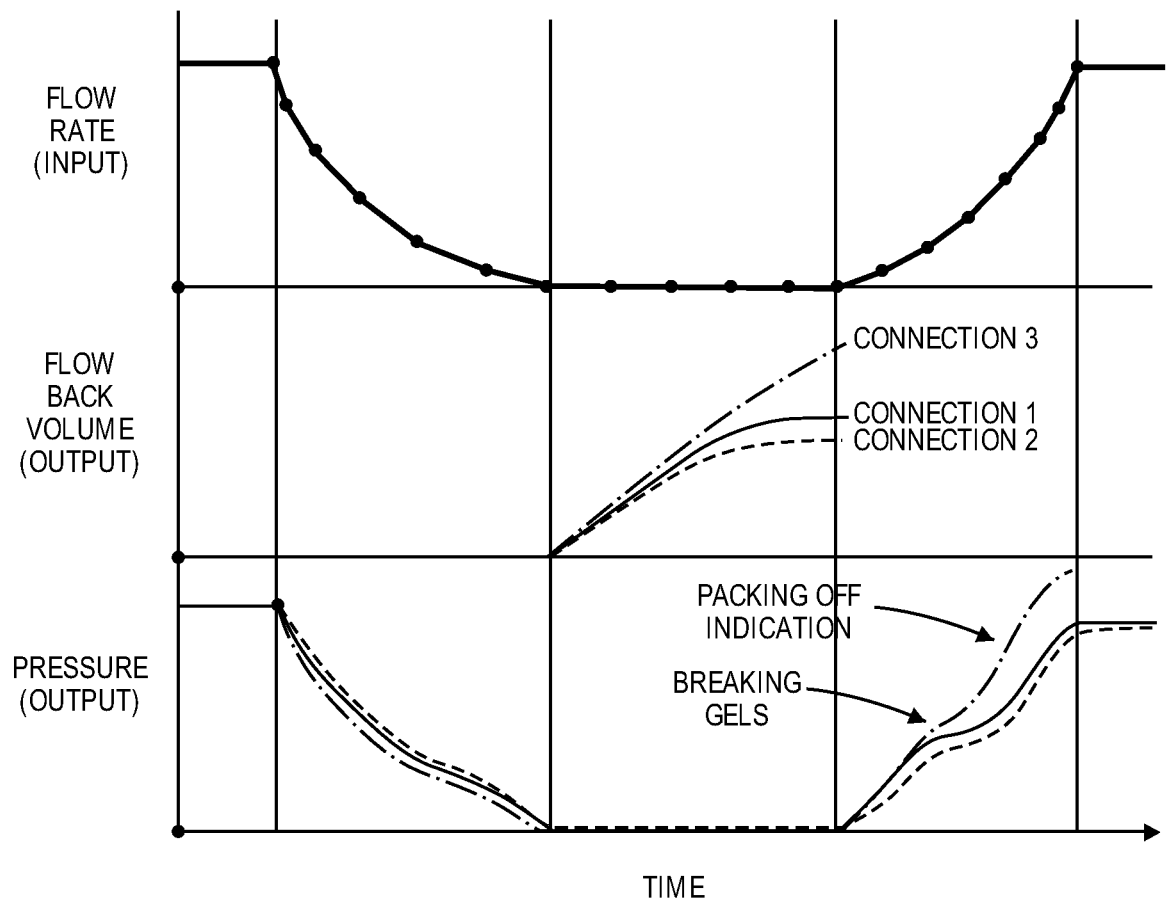

In some embodiments, for example, an automated sequence may include a programmed sequence for shutting down flow rate and RPM at the end of a connection and bringing up flow rate and RPM at the start of a connection. The programmed sequence may allow comparison of pumps off flow back profiles, may identify pressures required to break mud gel strength, and may identify torsional transients. FIG. 4B illustrates one example of a programmed process for shutting down flow rate and RPM at the end of a connection and bringing up flow rate and RPM at the start of a connection. As illustrated in FIG. 4B, the sequence may include varying the flow rate, for example, the flow rate of drilling mud, over time. The control system 100 may measure the responses to the sequence performed by the drilling system, for example, using one or more of the sensors 122, 128, and 134 located both at the surface and downhole. For example, flow back volume of drilling mud and pressure of the drilling mud may be measured at the surface.

Figure 4C:
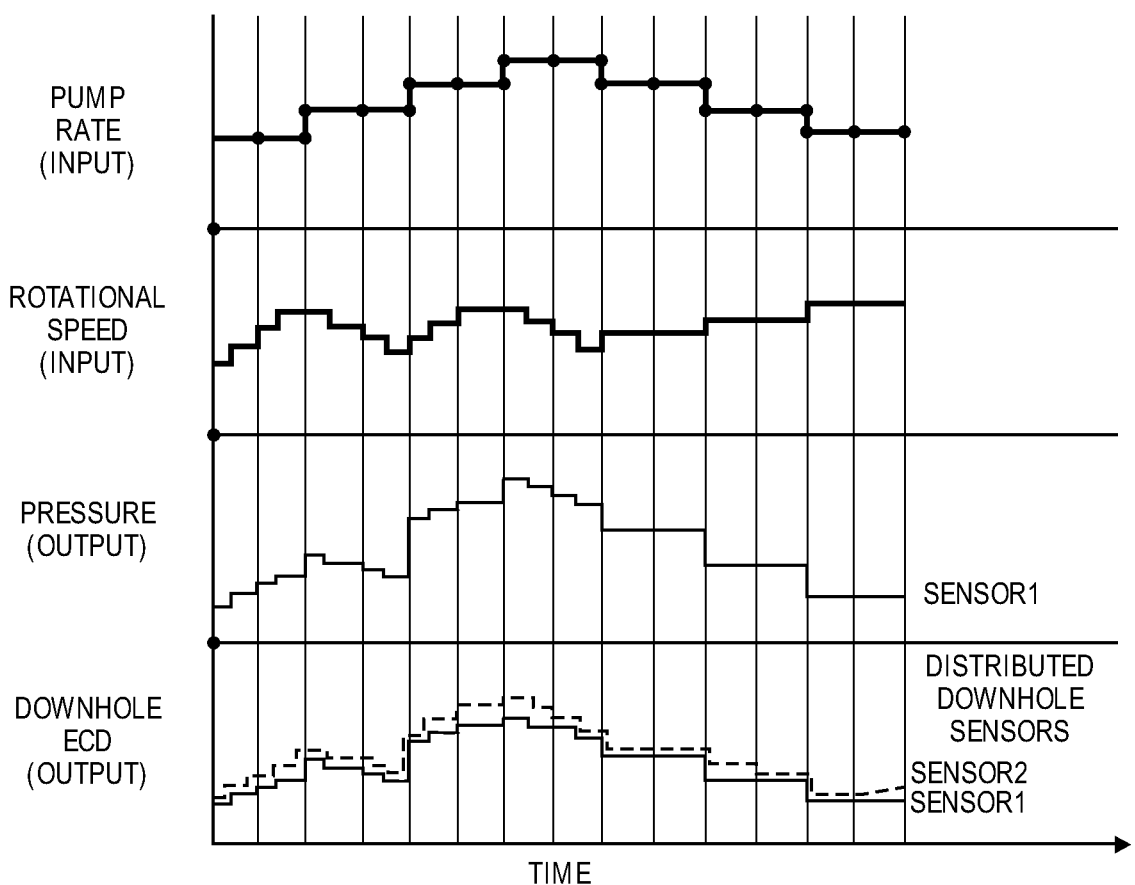

In some embodiments, for example, an automated sequence may include a programmed sequence of flow rate and RPM (or independent) changes. The programmed sequence may allow the drilling system to characterize the hydraulic system response and calibrate a hydraulics model. FIG. 4C illustrates an example of a programmed sequence of flow rate and RPM (or independent) changes. As illustrated in FIG. 4C, the sequence may include varying the pump rate, for example, the pump rate of drilling mud, over time. The sequence may also include varying the rotational speed, for example, the rotational speed of the drill bit, over time. The control system 100 may measure the responses to the sequence performed by the drilling system, for example, using one or more of the sensors 122, 128, and 134 located both at the surface and downhole. For example, pressure of the drilling mud may be measured at the surface, and ECD may be measured downhole.

In some embodiments, for example, an automated sequence may include a programmed sequence of moving the block up and down to characterize sheave friction and remove the effect from WOB and hookload calculations. The control system 100 may measure the responses to the sequence performed by the drilling system, for example, using one or more of the sensors 122, 128, and 134 located both at the surface and downhole.

In some embodiments, for example, an automated sequence may include a programmed sequence of moving the block up and down, with flow and RPM changes if required, to calibrate swab/surge. The control system 100 may measure the responses to the sequence performed by the drilling system, for example, using one or more of the sensors 122, 128, and 134 located both at the surface and downhole. For example, a downhole annular pressure measurement may be utilized with this automated sequence.

In some embodiments, for example, an automated sequence may include a programmed sequence of changing WOB while drilling, or RPM while drilling or off bottom, to understand system response and avoid exciting large transients. The control system 100 may measure the responses to the sequence performed by the drilling system, for example, using one or more of the sensors 122, 128, and 134 located both at the surface and downhole.

In some embodiments, for example, an automated sequence may include a programmed sequence of characterizing the relationship between WOB, differential pressure, and toolface while drilling with a motor. The control system 100 may measure the responses to the sequence performed by the drilling system, for example, using one or more of the sensors 122, 128, and 134 located both at the surface and downhole.

In some embodiments, for example, an automated sequence may include a programmed sequence of characterizing the relationships between drilling parameters and BHA vibrations, while drilling or reaming. The control system 100 may measure the responses to the sequence performed by the drilling system, for example, using one or more of the sensors 122, 128, and 134 located both at the surface and downhole.

In some embodiments, for example, an automated sequence may include a programmed sequence where a SLIDER® system cycles torque at the surface to improve weight transfer and control toolface with downhole feedback in the form of BHA toolface. The surface system may be programmed to automatically execute a sequence of operations (at defined points in the trajectory) to facilitate learning the system response and thereby improving the algorithms weight transfer and/or toolface control. The control system 100 may measure the responses to the sequence performed by the drilling system, for example, using one or more of the sensors 122, 128, and 134 located both at the surface and downhole.

In some embodiments, for example, an automated sequence may include a programmed sequence of monitoring the change in surface hookload at a range of flow rates circulating with rotation off bottom (measure up-lift effect). The control system 100 may measure the responses to the sequence performed by the drilling system, for example, using one or more of the sensors 122, 128, and 134 located both at the surface and downhole.

Figure 4D:
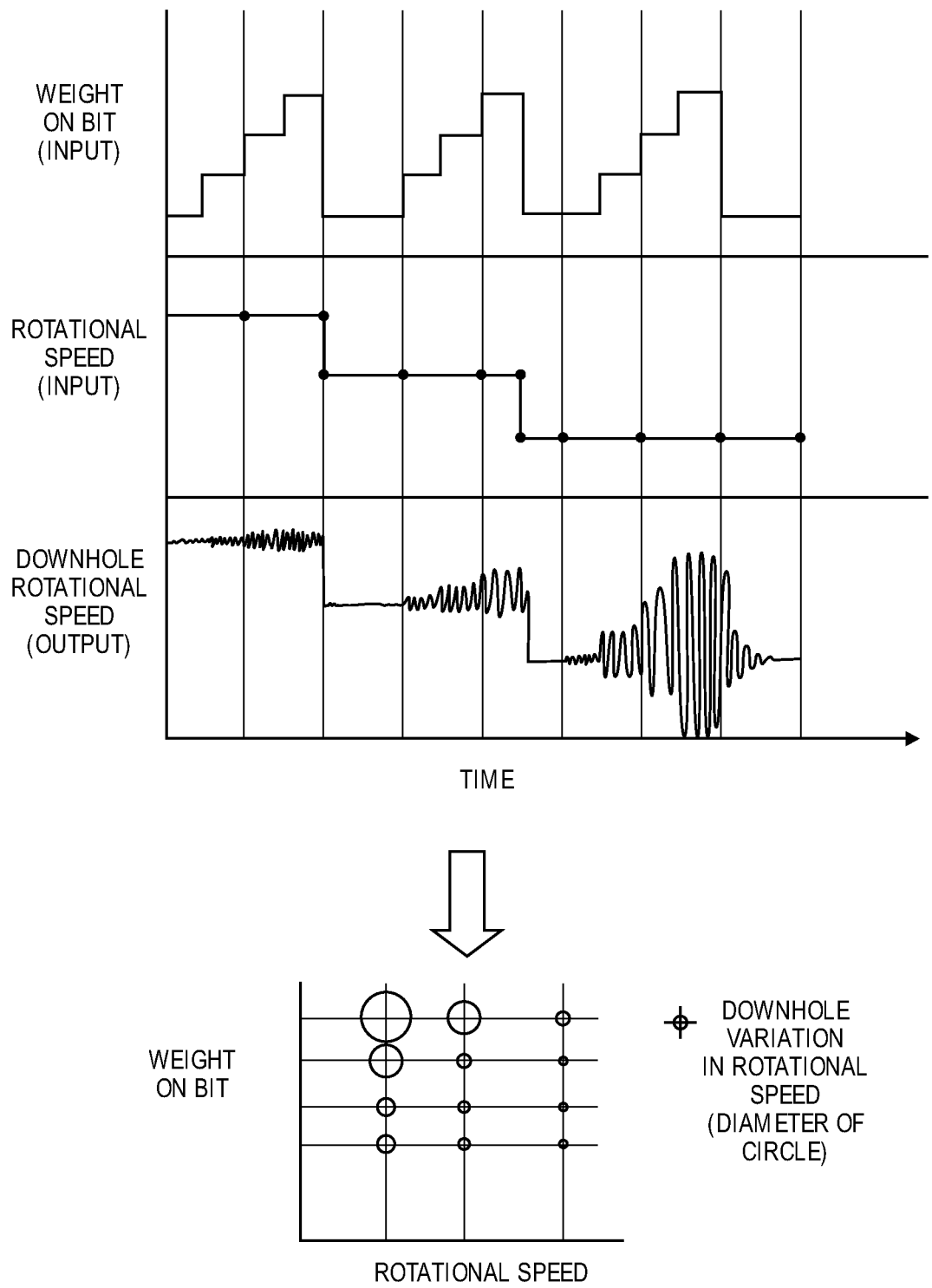

In some embodiments, for example, an automated sequence may include a programmed sequence of staging up weight on bit at a constant RPM to identify the point at which the rotational system becomes unstable and enters into fully developed stick-slip (torsional vibration mode). FIG. 4D illustrates one example of a programmed sequence of staging up weight on bit at a constant RPM. As illustrated in FIG. 4D, the sequence may include varying the WOB and rotational speed, over time. The control system 100 may measure the responses to the sequence performed by the drilling system, for example, using one or more of the sensors 122, 128, and 134 located both at the surface and downhole. For example, speed of the drill bit may be measured downhole. The control system 100 may also generate one or more additional graphs or plots to illustrate the responses, for example, the variation in downhole speed.

Figure 4E:
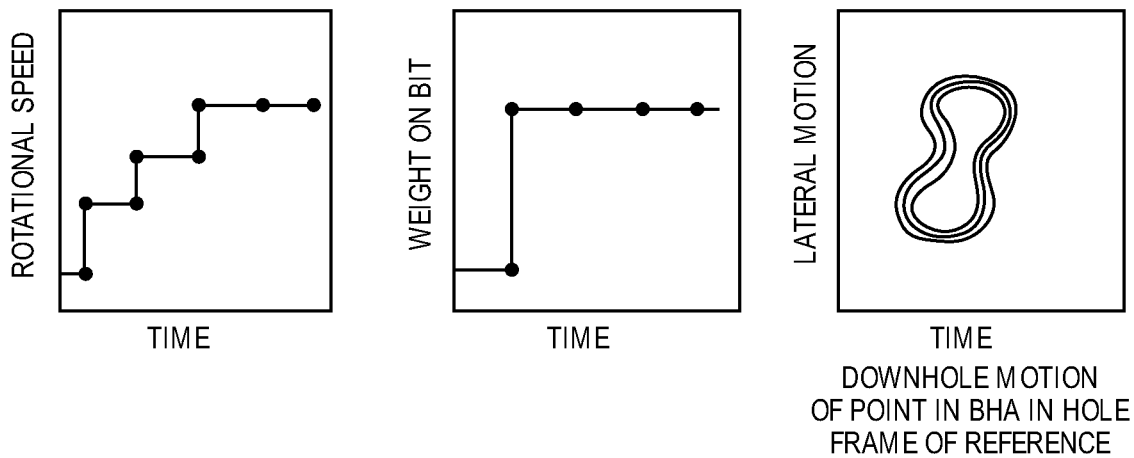
Figure 4E:
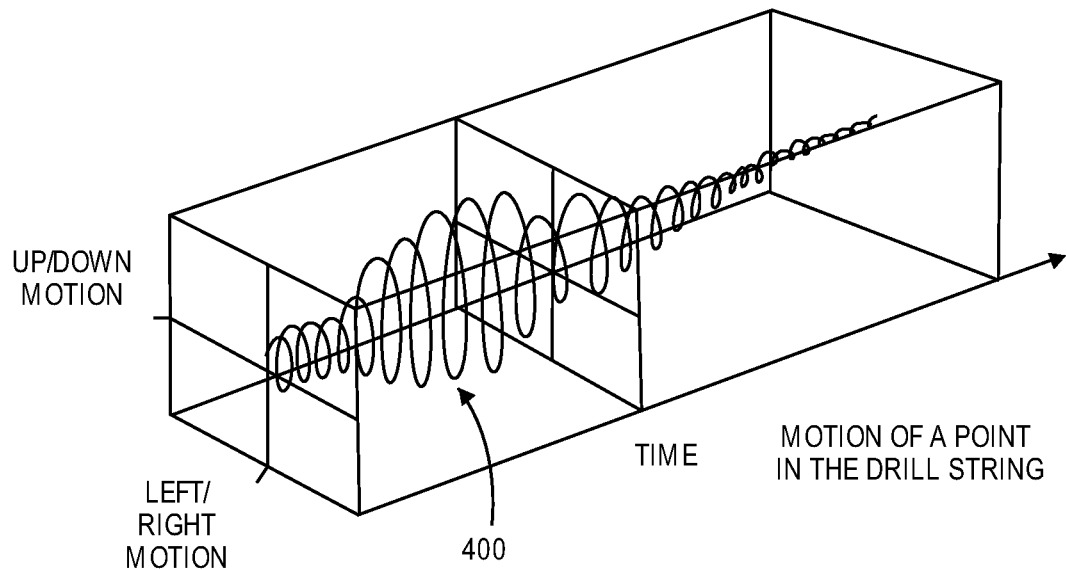

In some embodiments, for example, an automated sequence may include a programmed sequence that sweeps through a range of surface RPM's off bottom to identify the locations of lateral BHA resonances. FIG. 4E illustrates one example of a programmed sequence that sweep through a range of surface RPM's off bottom. As illustrated in FIG. 4E, the sequence may include varying the WOB and rotational speed, over time. The control system 100 may measure the responses to the sequence performed by the drilling system, for example, using one or more of the sensors 122, 128, and 134 located both at the surface and downhole. For example, lateral motion of the drill bit may be measured downhole. The control system 100 may also generate one or more additional graphs or plots to illustrate the responses, for example, a three dimensional plot of the lateral motion.

Figure 4F:
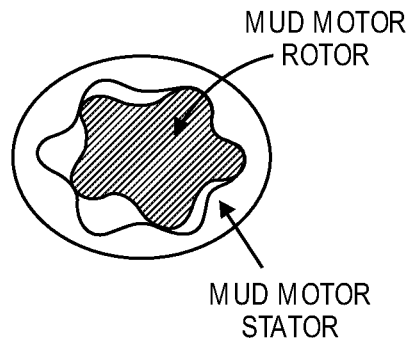
Figure 4G:
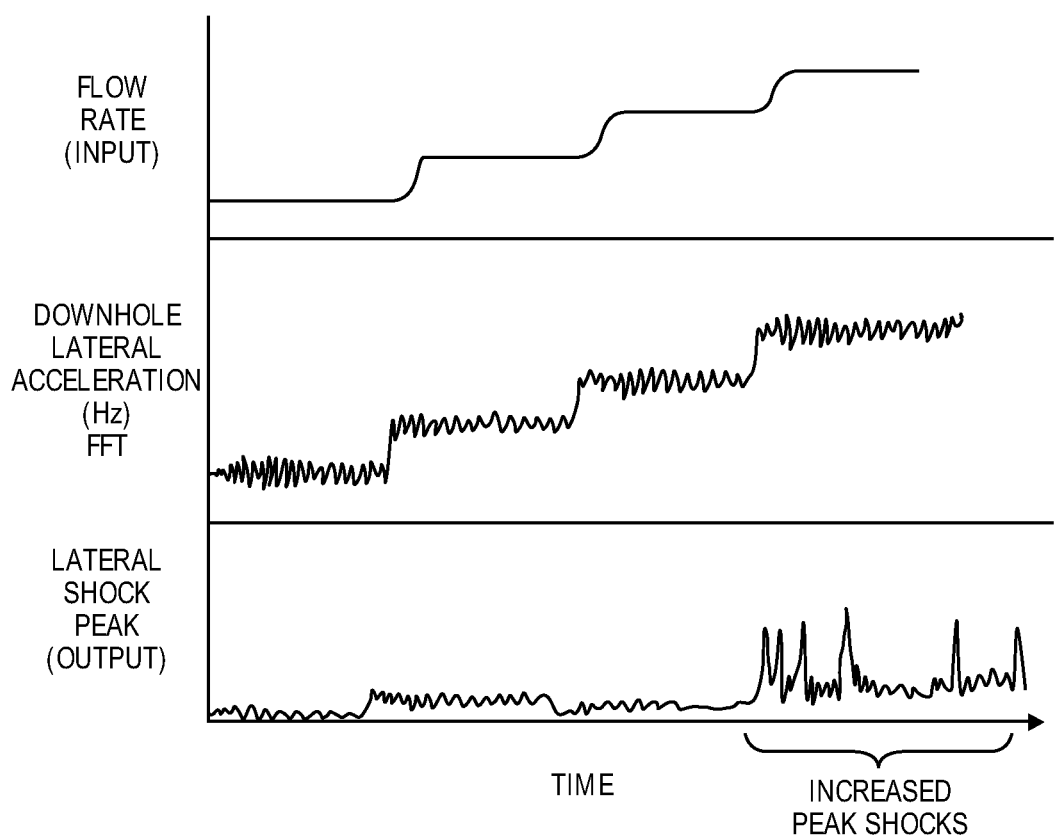

In some embodiments, for example, an automated sequence may include a programmed sequence that pumps at different flow rates (on or off bottom) to see if any correlation can be seen between BHA lateral stability (lateral resonances) and mud motor nutation frequency or RSS force actuations that generate excitations at frequencies which are a function of flow rate. FIGS. 4F and 4G illustrate one example of a programmed sequence that pumps at different flow rates (on or off bottom). As illustrated in FIG. 4F, drilling mud may be flowed into the mud motor rotor with a mud stator, which produces acceleration in the mud motor rotor. As illustrated in FIG. 4G, the sequence may include varying the flow rate, for example, flow rate of drilling mud, over time. The control system 100 may measure the responses to the sequence performed by the drilling system, for example, using one or more of the sensors 122, 128, and 134 located both at the surface and downhole. For example, lateral acceleration of the mud motor or the drill bit and the lateral shock peak may be measured downhole.

In some embodiments, for example, an automated sequence may include a programmed sequence that dynamically "tunes" an autodriller gain setting based upon a real-time derived bit-rock interaction model. This may reduce or eliminate the period of time spent searching for the right rate to move the blocks after a formation change, e.g., as compared to proportional-integral controllers. The control system 100 may measure the responses to the sequence performed by the drilling system, for example, using one or more of the sensors 122, 128, and 134 located both at the surface and downhole.

In some embodiments, for example, an automated sequence may include a programmed sequence that automatically modulates pump stroke rates to identify the optimum combination of pump strokes to maximize MWD telemetry signal to noise ration. The control system 100 may measure the responses to the sequence performed by the drilling system, for example, using one or more of the sensors 122, 128, and 134 located both at the surface and downhole.

In some embodiments, for example, an automated sequence may include a programmed sequence that varies weight when drilling with a motor and rotating and measuring pressure—then use the inverse when sliding. The control system 100 may measure the responses to the sequence performed by the drilling system, for example, using one or more of the sensors 122, 128, and 134 located both at the surface and downhole.

In some embodiments, for example, an automated sequence may include a programmed sequence that varies flow rate and measures motor speed. The flow rate may be varied and the motor speed measured by any equipment of the control system 100. The control system 100 may measure the responses to the sequence performed by the drilling system, for example, using one or more of the sensors 122, 128, and 134 located both at the surface and downhole.

In some embodiments, for example, an automated sequence may include a programmed sequence that varies potentially both flow rate and weight on bit and measuring motor speed and pressure to get motor speed versus flow rate and pressure. The control system 100 may measure the responses to the sequence performed by the drilling system, for example, using one or more of the sensors 122, 128, and 134 located both at the surface and downhole.

In some embodiments, for example, an automated sequence may include a programmed sequence that varies rotation speed and/or flow and measuring temperature at along the drill string 160 measurement subs. This may be used to calibrate friction models. The control system 100 may measure the responses to the sequence performed by the drilling system, for example, using one or more of the sensors 122, 128, and 134 located both at the surface and downhole.

In some embodiments, for example, an automated sequence may include a programmed sequence that, while drilling, moves the block down at varying rates. This may be used to examine the effect on rate of change of weight to determine drill string 160 axial compliance. The control system 100 may measure the responses to the sequence performed by the drilling system, for example, using one or more of the sensors 122, 128, and 134 located both at the surface and downhole.

In some embodiments, for any of the automated sequences described above, the context may be considered when selecting and scheduling the automated sequences. For example, the context can include a depth of the well, a trajectory of the wellbore being drilled, a type of mud being used, a type of drill string, BHA, and/or drill bit being employed, whether the hole is cased, and the like. The context may be taken into account when designing and executing the automated sequences. For example, the automated sequences may be changed as the drill string or borehole length increases or changes as a function of position within the planned trajectory.

In 306, the drilling operations may be performed. In some embodiments, the drilling operations may be performed automatically by the control system 100. In some embodiment, the drilling operations may be performed by the control system 100 with input from a user.

In 308, it can be determined if an automated sequence is scheduled to be performed. In some embodiments, for example, the control system 100 can continuously check, during drilling operations if an automated sequence is scheduled to be performed. At any given time, if an automated sequence is not scheduled to be performed, it can be determined if the drilling operation is complete, in 310. If drilling operations are complete, the method 300 can end. If drilling operations are not complete, the method 300 can return to 306 and continue drilling operations.

In 308, if an automated sequence is scheduled to be performed, it can be determined if the automated sequences needs to be updated in 311 and may be updated in 312. In some embodiments, for example, the control system 100 may be aware of the changes taking place during drilling operations (e.g. the drill string 160 getting longer). In response to the changes, the control system 100 may automatically update the automated sequences in accordance with the evolving well construction.

For example, in some embodiments, as the drill string 160 increases in length, it may take more time for the rotational speed to stabilize downhole after startup. In this example, the automated sequence may be modified so a wait period would be extended prior to taking an off bottom reference. Likewise, for example, in the automated sequence that includes a programmed sequence of moving the block up and down, with flow and RPM changes if required, to calibrate swab/surge. As the well is drilled, for example, the automated sequence may be adjusted by altering the up and down velocities to avoid exceeding an equivalent mud weight threshold defined at a point in the wellbore such as the casing shoe.

Once the automated sequence is updated (if necessary), the automated sequence can be executed and data can be collected during the automated sequence, in 313. In embodiments, the responses of the drilling system may be measured by sensors positioned on the surface and within the wellbore. For example, the data can be collected from the sensors 122, 128, and 134 of the drilling system. As discussed above, with reference to FIGS. 4A-4G, the control system 100 may collect the data and generate plots and graphs that illustrate the automated sequences and the collected data. The control system 100 may output, for example, one a display, the plots and graphs to a user of the control system 100.

In some embodiments, the execution of the sequence and collection of data may be performed automatically by the system 100. In some embodiment, the execution of the sequence and collection of data may be performed by the system 100 with input from a user.

In 314, the collected data can be collected and may be compared to the model of the drilling system response, and the model of the drilling system response can be calibrated. In 316, it can be determined if a change in the model or the collected data affect the drilling operations. If the drilling operations are affected, the drilling processes can be altered based on the change in the model or the collected data, in 318. In some embodiments, for example, the collected data and/or the calibrated models may be used to govern how the drilling system is controlled (how motion inputs are made at surface: pumping, rotating and block movements) to safely maximize drilling performance and efficiency. This may be an ongoing, evolving process as the drilling process takes place. In some embodiments, for example, the system may be able to identify deviations from expected trends at an early stage and alert the user or automatically implement an appropriate response procedure. In some embodiments, for example, the system 100 may use the calibrated models of system response to provide updated operational boundaries to maintain the drilling system operation within a safe/stable zone.

In 320, the collected data and the calibrated model can be stored. In some embodiments, the collected data and/or the calibrated models may be stored for use in future drilling operations. For example, the collected data may be stored as a matrix of system response properties identified using automated sequences/modulation in depth and time domains.

Figure 5:
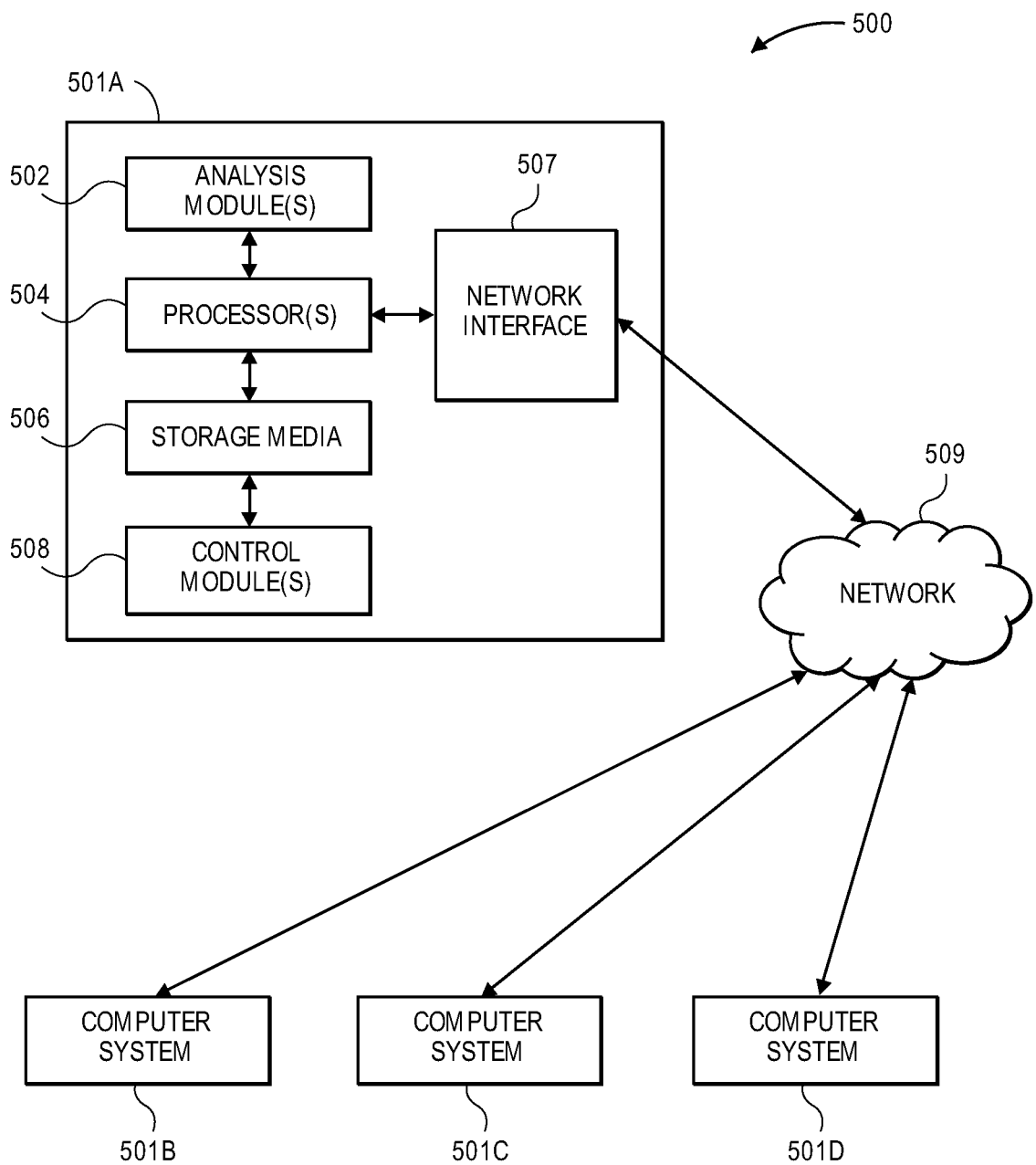
FIG. 5 illustrates a schematic view of a computing system according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURRY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 500 contains one or more rig control module(s) 508. In the example of computing system 500, computer system 501A includes the rig control module 508. In some embodiments, a single rig control module may be used to perform some or all aspects of one or more embodiments of the methods disclosed herein. In alternate embodiments, a plurality of rig control modules may be used to perform some or all aspects of methods herein.

It should be appreciated that computing system 500 is only one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. A method, comprising:
scheduling, by a control system, an automated sequence to be performed by a drilling system during a predetermined stage and/or at a predetermined point in time of a well construction process, wherein the automated sequence comprises varying a flow rate of a fluid being pumped into a wellbore;
determining, based on sensor data, a change in conditions of the drilling system, wherein the sensor data comprises a correlation between a lateral movement of a downhole tool in the wellbore and the flow rate while the flow rate is varied, and a correlation between a lateral shock peak of the downhole tool and the flow rate while the flow rate is varied, and wherein the change in conditions comprises an excitation of the downhole tool exceeding a predetermined threshold;
determining, based on the change in conditions and using a model of the drilling system, an update to the automated sequence, wherein the update modifies a first operational parameter and holds constant a second operational parameter; and
performing a first drilling operation according to the automated sequence and based on the update.

2. The method of claim 1, further comprising:
adding, based on a current stage of the well construction process, a second drilling operation to the series of drilling operations to produce an adjusted automated sequence; and
performing the adjusted automated sequence.

3. The method of claim 1,
wherein the model is a bit-rock interaction model,
wherein the automated sequence comprises a second drilling operation that moves a block at a first velocity corresponding to the first operational parameter,
wherein the change in conditions corresponds to a rock formation change, and
wherein the update changes the first velocity to a second velocity different from the first velocity.

4. The method of claim 1, further comprising:
obtaining, by the control system, the sensor data from a vibration sensor;
determining, based on the sensor data, a relationship between a subset of the plurality of operational parameters and vibrations of the drilling system during a second drilling operation of the automated sequence; and
determining a response of the drilling system based on the relationship.

5. The method of claim 1,
wherein the automated sequence decreases a flow rate of a pump at a starting point in the automated sequence, and
wherein the automated sequence increases a flow rate of the pump at an ending point in the automated sequence.

6. The method of claim 1, wherein the automated sequence comprises a first operation of moving a block up and a second operation of moving the block down, and wherein the automated sequence determines a sheave friction from a movement of the block up and down.

7. The method of claim 1, wherein the predetermined stage of the well construction process comprises or is defined by a predetermined depth of the well bore during the well construction process.

8. The method of claim 1, wherein:
the automated sequence further comprises:
decreasing the flow rate of the fluid being pumped into the wellbore, a rotational speed of the downhole tool, or both at an end of a connection of the downhole tool; and
increasing the flow rate, the rotational speed, or both at a beginning of a different connection of the downhole tool;
the sensor data further comprises a pressure of the fluid while the flow rate, the rotational speed, or both are varied; and
the change in conditions further comprises a mud gel breaking in the wellbore, a packoff occurring in the wellbore, or both.

9. The method of claim 1, wherein:
the automated sequence further comprises varying a rotational speed of an upper end of the downhole tool while the downhole tool is off bottom;
the sensor data further comprises the lateral movement of a lower end of the downhole tool while the rotational speed is varied; and
the change in conditions further comprises a lateral resonance of the downhole tool exceeding a predetermined threshold.

10. The method of claim 1, wherein:
the automated sequence further comprises:
increasing a weight on the downhole tool while holding constant a first rotational speed of an upper end of the downhole tool; and
increasing the weight on the downhole tool in the wellbore while holding constant a second rotational speed of the upper end of the downhole tool, wherein the first and second rotational speeds are different;
the sensor data further comprises the rotational speed of a lower end of the downhole tool while increasing the weight on the upper end of the downhole tool; and
the change in conditions further comprises a torsional vibration of the downhole tool exceeding a predetermined threshold.

11. A non-transitory computer readable medium storing instructions for causing one or more processors to perform a method comprising:
scheduling, by a control system, an automated sequence to be performed during by a drilling system a predetermined stage and/or at a predetermined point in time of a well construction process, wherein the automated sequence comprises varying a flow rate of a fluid being pumped into a wellbore;
determining, based on sensor data, a change in conditions of the drilling system, wherein the sensor data comprises a correlation between a lateral movement of a downhole tool in the wellbore and the flow rate while the flow rate is varied, and a correlation between a lateral shock peak of the downhole tool and the flow rate while the flow rate is varied, and wherein the change in conditions comprises an excitation of the downhole tool exceeding a predetermined threshold;
determining, based on the change in conditions and using a model of the drilling system, an update to the automated sequence, wherein the update modifies a first operational parameter and holds constant a second operational parameter; and
performing a first drilling operation according to the automated sequence and based on the update.

12. The non-transitory computer readable medium of claim 11, the method further comprising:
adding, based on a current stage of the well construction process, a second drilling operation to the series of drilling operations to produce an adjusted automated sequence; and
performing the adjusted automated sequence.

13. The non-transitory computer readable medium of claim 11,
wherein the model is a bit-rock interaction model,
wherein the automated sequence comprises a second drilling operation that moves a block at a first velocity corresponding to the first operational parameter,
wherein the change in conditions corresponds to a rock formation change, and
wherein the update changes the first velocity to a second velocity different from the first velocity.

14. The non-transitory computer readable medium of claim 11, further comprising:
obtaining, by the control system, the sensor data from a vibration sensor;
determining, based on the sensor data, a relationship between a subset of the plurality of operational parameters and vibrations of the drilling system during a second drilling operation of the automated sequence; and
determining a response of the drilling system based on the relationship.

15. The non-transitory computer readable medium of claim 11,
wherein the automated sequence decreases a flow rate of a pump at a starting point in the automated sequence, and
wherein the automated sequence increases a flow rate of the pump at an ending point in the automated sequence.

16. The non-transitory computer readable medium of claim 11, wherein the automated sequence comprises a first operation of moving a block up and a second operation of moving the block down, and wherein the automated sequence determines a sheave friction from a movement of the block up and down.

17. The non-transitory computer readable medium of claim 11, wherein the predetermined stage of the well construction process comprises or is defined by a predetermined depth of the wellbore during the well construction process.

18. A system, comprising:
a drilling system coupled to a drilling rig; and
a control system coupled to the drilling system, the control system comprising functionality to:
schedule, by a control system, an automated sequence to be performed by a drilling system during a predetermined stage and/or at a predetermined point in time of a well construction process, wherein the automated sequence comprises varying a flow rate of a fluid being pumped into a wellbore;
determine, based on sensor data, a change in conditions of the drilling system, wherein the sensor data comprises a correlation between a lateral movement of a downhole tool in the wellbore and the flow rate while the flow rate is varied, and a correlation between a lateral shock peak of the downhole tool and the flow rate while the flow rate is varied, and wherein the change in conditions comprises an excitation of the downhole tool exceeding a predetermined threshold;
determine, based on the change in conditions and using a model of the drilling system, an update to the automated sequence, wherein the update modifies a first operational parameter and holds constant a second operational parameter; and cause the drilling system to perform a first drilling operation according to the automated sequence and based on the update.

19. The system of claim 18, wherein the control system further comprises functionality to:

add, based on a current stage of the well construction process, a second drilling operation to the series of drilling operations to produce an adjusted automated sequence; and perform the adjusted automated sequence.

20. The system of claim 18, wherein the predetermined stage of the well construction process comprises or is defined by a predetermined depth of the well bore during the well construction process.

* * * * *